United States Patent [19]

McCarthy, Jr.

[11] 4,391,868
[45] Jul. 5, 1983

[54] LAMINATION OF POLYVINYL CHLORIDE CAST FILMS

[75] Inventor: Harold J. McCarthy, Jr., Mohrsville, Pa.

[73] Assignee: The Goodyear Tire & Rubber Company, Akron, Ohio

[21] Appl. No.: 310,570

[22] Filed: Oct. 13, 1981

[51] Int. Cl.³ .......................... B32B 7/02; B32B 27/30
[52] U.S. Cl. ................................... 428/215; 428/220; 428/518; 428/520; 428/913
[58] Field of Search ............... 428/332, 518, 337, 515, 428/913, 215, 220, 520

[56] References Cited

U.S. PATENT DOCUMENTS

| 3,328,196 | 6/1967 | Sincock | 428/518 X |
| 4,100,325 | 7/1978 | Summers et al. | 428/518 X |
| 4,317,861 | 3/1982 | Kidoh et al. | 428/518 X |
| 4,320,174 | 3/1982 | Rabinovitch et al. | 428/518 |

Primary Examiner—Thomas J. Herbert, Jr.
Attorney, Agent, or Firm—J. D. Wolfe; R. D. Thompson

[57] ABSTRACT

The invention relates to a laminated rigid vinyl homopolymer comprising two solution cast films each having a thickness of 0.00762 centimeter and being adhered together with an actinic light activatable adhesive to give a thickness of essentially 0.01524 centimeter.

3 Claims, 1 Drawing Figure

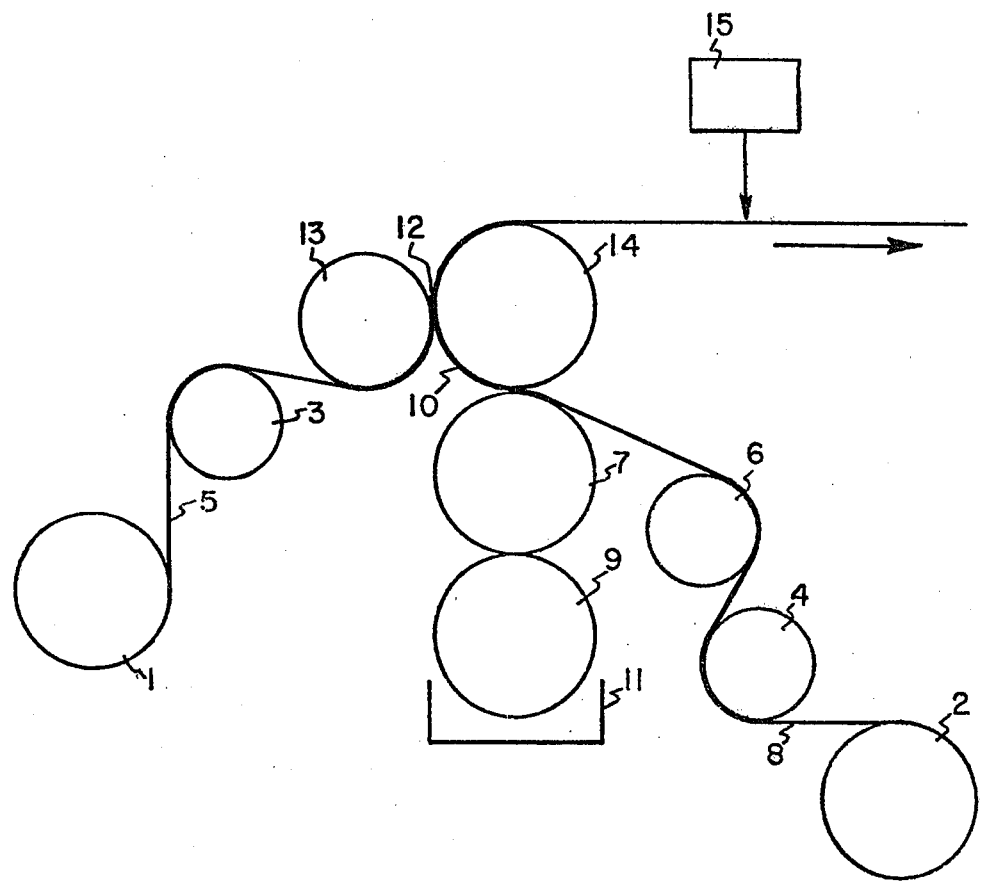

ized mask and cured with actinic light, electronic or ultra violet light for a duration to set up the adhesive so it holds the two films together for subsequent micropit replication on standard video disc replication equipment.

LAMINATION OF POLYVINYL CHLORIDE CAST FILMS

TECHNICAL FIELD

This invention relates to a process for making an improved rigid vinyl homopolymer laminate film having greater freedom from contaminates and therefore having properties including thickness desirable for use in making vidio discs and video tapes.

BACKGROUND

The video vision disc and video tapes currently are used in video vision player systems. The various manufacturers have agreed the film used in these systems shall be 0.01524 centimeter thick. The rigid vinyl homopolymer film of this thickness has been accepted because it has the best optical properties as its relates to nonrefractivity. The commercial film is made by calendering, but unfortunately calendered film has relatively high contaminant levels, viz particularly gel levels, exhibits shrinkage and lacks uniformity in MD and TD. Consequently the film exhibits ellipticity when replicated at 100° to 125° C. and at 29.53 to 30.22 kilogram/square milometer, as well as relatively wide gauge variance.

DISCLOSURE AND PRACTICE OF THE INVENTION

I have discovered that solution cast rigid vinyl homopolymer film has relative to a calendered film greater freedom from contamination, less vague variance and reduced ellipticity during replication but solution cast film cannot be made readily in the gauge required for standard video disc or tapes. I have discovered that if rigid film is solution cast to a thickness of 0.00762 centimeter it can be laminated together with actinic light activatable adhesive to give a film laminate that has excellent properties and which can be micropit replicated to produce an excellent film for video discs or video tapes.

BRIEF DESCRIPTION OF THE DRAWING

The nature of the invention can be more readily appreciated by reference to the following schematic drawing.

In the FIGURE the numerals 1 and 2 represent rolls of solution cast rigid vinyl homopolymer film 0.00762 centimeter thick. Numeral 3 represents tensioning a roll over which the film 5 passes. Likewise numerals 4 and 6 represent tensioning rolls over which the film 8 contacts adhesive transfer roll 7 to coat underside 10 of film 8 with a coat of said adhesive. Adhesive transfer roll 7 contacts roll 9 that rotates in adhesive container 11 to pick up the adhesive to be transferred to roll 9 and ultimately to underside 10 of film 8. Film 8 and film 5 pass between the nip 12 of rolls 13 and 14 to bring the films into laminating contact before they pass under station 15 where ultraviolet or electronic beam activates the adhesive to bond the two films together.

The rolls 1 and 2 of films are made by solution coating a solution of homopolyvinyl chloride on a moving belt such as a polyvinyl alcohol or a stainless steel one and removing the solvent at a suitable temperature, preferably 38° to 95° C. for tetrahydrofuran. Preferably the solution comprises 15 to 16 percent by weight of rigid vinyl homopolymer in tetrahydrofuran. When the thickness doctored on the moving belt exceeds about 0.01 centimeter the film tends to have bubbles. Therefore it is preferred to doctor to give a dry film 0.00762 centimeter thick.

The radiation curable adhesive can be any of the ethylenic unsaturated vinyl adhesives such as the tacky acrylate and methacrylate polymers containing 1 to 20 percent and preferably 3 to 7 percent of an ethylenically unsaturated solvent such as the liquid diacrylates and dimethylacrylates of the glycols and ether glycols such as ethylene, propylene, butylene and decylene. The epoxy resin containing ethylenic unsaturation as well as ethylenic unsaturated polyester can be used too. The copolymer of 60 to 30 parts acrylonitrile and 40 to 70 parts of 2-ethylhexyl methacrylate is particularly desired where the plasticizer level is high in the vinyl film and should contain only sufficient solvent to permit the copolymer to be picked up by the dip roll.

A very desirable radiation curable acrylic achesive is that of PPG Industries with the trade name designation of OC 117-21-B. Another very desirable commercially radiation curable adhesive is Polyrad SN 405, a trade name designation of Polymer Industries.

The liquid ethylenic unsaturated acrylates and methacrylates can be used to render the polymers and copolymers spreadable and then be cured by radiation. The low melting unsaturated polyesters are particularly desirable as they can be used as a hot melt and transferred to the under side of the film to adhere two films together and then be crosslinked with strong actinic light such as and electron beam or ultra violet rays.

Suitable polyesters are made by condensation of glycol or glycol ethers with the organic acids and their anhydrides with 0.1 to 20 mol percent and preferably 1 to 5 mol percent of an unsaturated acid as their anhydrides, such as fumaric, maleic or itaconic, to name a few of the well known ones having from 4 to 12 carbon atoms.

The unsaturated glycols may be used, too. Representative members having 4 to 12 carbon atoms are 1,4-butene diol and pentane diol.

In many instances it is desirable to include the well known ultraviolet activators in 0.1 to 5 percent by weight in the adhesive to enhance the receptability of the radiation curable adhesive to radition curing. The aryl substituted acetophenones are particularly desirable where mercury lights are used.

BEST MODE OF CARRYING OUT THE INVENTION

Rolls of commercially available cast polyvinyl chloride film 0.00762 centimeter thick were positioned on the lamination apparatus as shown by numerals 1 and 2 of the drawings. The bath 11 was charged with PPG Industries' curable acrylic adhesive (OC 117-21-B). The film was threaded over the rolls as shown in the drawing to pass beneath the electron beam apparatus of station 15. In operation the liquid curable acrylate adhesive is picked up by roll 9 and transferred to roll 7 to be coated on under side 10 of the film from roll 2. Generally the adhesive coating will vary from 2 to $5 \times 10^{-4}$ centimeters and the radiation dosage can vary from 0.1 to 5, with the preferred range being 0.5 to 2 megarads, as this rate permits the film to be laminated at a relatively fast speed, i.e. $3.048 \times 10^{-2}$ to $9.144 \times 10^{-2}$ kilometers per minute, without appreciable head buildup or distortion of the laminate. The laminate had a thickness of 0.015 centimeter and was satisfactory for use in making video discs and video tapes.

While certain representative embodiments and details have been shown for the purpose of illustrating the invention it will be apparent to those skilled in this art that various changes and modifications may be made therein without departing from the spirit or scope of the invention.

I claim:

1. A laminated rigid vinyl chloride homopolymer comprising two solution cast films each having a thickness of 0.00762 centimeter and being adhered together with an actinic light activatable adhesive to give a thickness of essentially 0.01524 centimeter.

2. The laminate of claim 1 wherein said solution comprising 15 to 16 percent by weight of rigid polyvinyl chloride in tetrahydrofuran.

3. The laminate of claim 1 wherein the actinic light activatable adhesive contains an ethylenic group supplied by acrylate or methacrylate radicals.

* * * * *